United States Patent
Lehmann et al.

(10) Patent No.: US 7,246,131 B2
(45) Date of Patent: Jul. 17, 2007

(54) DIALOG FRAGMENTATION FOR MOBILE DEVICES

(75) Inventors: Falk Lehmann, Dresden (DE); Thomas Springer, Dresden (DE); Gerald Huebsch, Dresden (DE); Axel Spriestersbach, Karlsruhe (DE); Thomas Ziegert, Darmstadt (DE)

(73) Assignee: Sap Aktiengesellschaft, Walldorf (DE)

( * ) Notice: Subject to any disclaimer, the term of this patent is extended or adjusted under 35 U.S.C. 154(b) by 490 days.

(21) Appl. No.: 10/813,617

(22) Filed: Mar. 31, 2004

(65) Prior Publication Data

US 2005/0114162 A1   May 26, 2005

Related U.S. Application Data

(60) Provisional application No. 60/524,859, filed on Nov. 26, 2003, provisional application No. 60/524,857, filed on Nov. 26, 2003, provisional application No. 60/524,858, filed on Nov. 26, 2003.

(51) Int. Cl.
  *G06F 17/30* (2006.01)
  *G06F 7/00* (2006.01)
(52) U.S. Cl. .................. 707/101; 707/102; 707/10
(58) Field of Classification Search ................ 707/101, 707/10, 102; 715/500; 709/200
  See application file for complete search history.

(56) References Cited

U.S. PATENT DOCUMENTS

2002/0078165 A1* 6/2002 Genty et al. ................ 709/217
2004/0073867 A1* 4/2004 Kausik et al. .............. 715/500
2004/0103371 A1* 5/2004 Chen et al. .................. 715/513
2005/0188004 A1* 8/2005 Bergenwall et al. ........ 709/203

OTHER PUBLICATIONS

Mandyam, Srinivas, et al., "User Interface Adaptations: Indispensible for Single Authoring," undated materials, retrieved from the Internet on Oct. 29, 2004, at http://www.w3.org/2002/07/DIAT/posn/covigo/covigo_position_paper.html, 8 pgs.

Rodriguez, Juan R., et al., "New Capabilities in IBM WebSphere Transcoding Publisher Version 3.5: Extending Web Applications to the Pervasive World," May 2001, retrieved from the Internet on Oct. 29, 2004, at http://www.redbooks.ibm.com/pubs/pdfs/redbooks/sg246233.pdf, pp. 295-330.

* cited by examiner

*Primary Examiner*—John Cottingham
*Assistant Examiner*—Kuen S. Lu
(74) *Attorney, Agent, or Firm*—Fish & Richardson P.C.

(57) ABSTRACT

Servicing a request for information from a device with limited network, memory, and display resources includes receiving a request for a page of information from a client device. The requested page is retrieved, and points within the page at which the page may be divided into sub-pages are identified. The points at which the page may be divided may be statically defined within the page or dynamically determined from the structure of the page. The page is separated at the identified points into multiple sub-pages, and it is determined if each of the multiple sub-pages may be used by the client device. A sub-page may be used by the client device if a weight of the sub-page, which may be expressly calculated or estimated, is less than a maximum allowable weight. The multiple sub-pages are linked, and the multiple sub-pages are individually transferred to the client device.

53 Claims, 10 Drawing Sheets

DIALOG FRAGMENTATION FOR MOBILE DEVICES

CROSS REFERENCE TO RELATED APPLICATIONS

This application claims the benefit of U.S. Provisional Application No. 60/524,859, filed Nov. 26, 2003, and titled "Dynamic Dialog Fragmentation Using Unique Identifiers", U.S. Provisional Application No. 60/524,857, filed Nov. 26, 2003, and titled "Static Dialog Fragmentation For Device Independent Mark-Up", and U.S. Provisional Application No. 60/524,858, filed Nov. 26, 2003, and titled "Dynamic Dialog Fragmentation Using Heuristics Based on Linear Regression."

TECHNICAL FIELD

This document relates to fragmentation of information for display on mobile devices.

BACKGROUND

Mobile computing devices may be used to access enterprise applications and information from almost any location serviced by the appropriate network. However, each mobile computing device may have different capabilities that affect how the enterprise applications and the information are accessed. For example, the network resources available to transfer information to the mobile devices may be limited, the memory available on the mobile devices to store the information may be limited, or the space available to display the information on the mobile devices may be limited. Further restrictions may be imposed by network protocols, supported content types, and device usability.

SUMMARY

In one general aspect, servicing a request for information from a device with limited network, memory, and display resources includes receiving a request for a page of information from a client device. The requested page is retrieved, and points within the page at which the page may be divided into sub-pages are identified. The page is separated at the identified points into multiple sub-pages, and it is determined if each of the multiple sub-pages may be used by the client device. The multiple sub-pages are linked, and the multiple sub-pages are individually transferred to the client device.

In another general aspect, fragmenting a page for a device that is unable to receive or display the page as a whole includes identifying a page that is to be sent to a client device. The page is divided into atomic pieces, and the atomic pieces are combined to construct multiple sub-pages. A weight of each of the multiple sub-pages is estimated, and the weight of each of the multiple sub-pages is compared to a maximum allowable weight. The multiple sub-pages are individually transferred to the client device.

In another general aspect, fragmenting a page for a device that is unable to receive or display the page as a whole includes identifying a page that is to be sent to a client device. The page is divided into atomic pieces of the page, and the atomic pieces are combined to construct multiple sub-pages of the page. Each of the multiple sub-pages is translated into a language used to display information on the client device. A weight of each of the translated sub-pages is calculated, and the weight of each of the translated sub-pages is compared to a maximum allowable weight. The translated sub-pages are individually transferred to the client device.

In yet another general aspect, fragmenting a page for a device that is unable to receive or display the page as a whole includes identifying a page that is to be sent to a client device. Fragmentation points within the page at which the page may be divided into sub-pages are identified. The page is divided at at least one of the identified fragmentation points to create multiple sub-pages. A weight of each of the multiple sub-pages is estimated, and the weight of each of the multiple sub-pages is compared to a maximum allowable weight. The multiple sub-pages are individually transferred to the client device.

In yet another general aspect, fragmenting a page for a device that is unable to receive or display the page as a whole includes identifying a page that is to be sent to a client device. Fragmentation points within the page at which the page may be divided into sub-pages are identified. The page is divided at at least one of the identified fragmentation points to create multiple sub-pages, and each of the multiple sub-pages is translated into a language used to display the sub-pages on the client device. A weight of each of the translated sub-pages is calculated, and the weight of each of the translated sub-pages is compared to a maximum allowable weight. The translated sub-pages are individually transferred to the client device for display.

Implementations may include one or more of the following features. For example, separating the page at the identified points may include selecting at least one of the identified points and dividing the page at the at least one selected point to create multiple sub-pages.

The points within the page at which the page may be divided into sub-pages may define atomic pieces of the page that may not be further divided. Separating the page at the identified points into multiple sub-pages may include dividing the page into atomic pieces at the identified points and combining the atomic pieces to construct the multiple sub-pages.

The identified points may be defined by elements of a language in which the information is represented, and the elements may define the atomic pieces of the page.

Dividing the page into atomic pieces at the identified points may include identifying atomic pieces of the page and identifying structures within the page that include the atomic pieces. Descriptions of the structures may be coupled to the atomic pieces, and the coupling of the atomic pieces and the corresponding descriptions of the structures may be added to a set of atomic pieces of the page.

Combining the atomic pieces to construct the multiple sub-pages may include creating a sub-page of the multiple sub-pages, the sub-page having a weight that is initially zero. A single atomic piece may be identified, and where in the sub-page the single atomic piece may be added may be determined. Whether the single atomic piece may be added to the sub-page also may be determined. The single atomic piece may be added to the sub-page, the weight of the sub-page may be updated based on the addition of the single atomic piece to the sub-page.

Determining whether the single atomic piece may be added to the sub-page may include determining if the weight of the sub-page with the single atomic piece added is less than or equal to a maximum allowable weight for each of the multiple sub-pages. Determining if the weight of the sub-page with the single atomic piece added is less than or equal to a maximum allowable weight for each of the multiple sub-pages may include determining if a size in memory of the sub-page with the single atomic piece added is less than or equal to a maximum allowable size in memory for each of the multiple sub-pages.

Determining if the weight of the sub-page with the single atomic piece added is less than or equal to a maximum allowable weight for each of the multiple sub-pages may include determining if a display space used by the sub-page with the single atomic piece added is less than or equal to a maximum allowable display space used by each of the multiple sub-pages. Determining if the weight of the sub-page with the single atomic piece added is less than or equal to a maximum allowable weight for each of the multiple sub-pages may include determining if a network data unit size required for the sub-page with the single atomic piece added is less than or equal to a maximum allowable network data unit size required for each of the multiple sub-pages.

Determining if the weight of the sub-page with the single atomic piece added is less than or equal to a maximum allowable weight for each of the multiple sub-pages may include determining if a network latency for the sub-page with the single atomic piece added is less than or equal to a maximum allowable network latency for each of the multiple sub-pages. Determining if the weight of the sub-page with the single atomic piece added is less than or equal to a maximum allowable weight for each of the multiple sub-pages may include determining if input devices required by the sub-page with the single atomic piece added are available on the client device.

Determining if each of the multiple sub-pages may be used by the client device may include translating each of the multiple sub-pages into a language used to display the multiple sub-pages. A weight of each of the multiple sub-pages after translation may be calculated, and each of the calculated weights may be compared to a maximum allowable weight.

Calculating the weight of each of the multiple sub-pages after translation may include calculating a size in memory of each of the multiple sub-pages after translation. Calculating the weight of each of the multiple sub-pages after translation may include calculating a display space used by each of the multiple sub-pages after translation. Calculating the weight of each of the multiple sub-pages after translation may include calculating a network data unit size required for each of the multiple sub-pages after translation. Calculating the weight of each of the multiple sub-pages after translation may include calculating a network latency for each of the multiple sub-pages after translation. Calculating the weight of each of the multiple sub-pages after translation may include identifying input devices required by each of the multiple sub-pages after translation, and comparing each of the calculated weights to a maximum allowable weight may include determining if the input devices required by each of the multiple sub-pages after translation are available on the client device.

Determining if each of the multiple sub-pages may be used by the client device may include estimating a weight of each of the multiple sub-pages and comparing each of the estimated weights to a maximum allowable weight.

Estimating the weight of each of the multiple sub-pages may include estimating a size in memory of each of the multiple sub-pages. Estimating the weight of each of the multiple sub-pages may include estimating a display space used by each of the multiple sub-pages. Estimating the weight of each of the multiple sub-pages may include estimating a network data unit size required for each of the multiple sub-pages. Estimating the weight of each of the multiple sub-pages may include estimating a network latency for each of the multiple sub-pages. Estimating the weight of each of the multiple sub-pages may include estimating input devices required by each of the multiple sub-pages, and comparing each of the estimated weights to a maximum allowable weight may include determining if the input devices required by each of the multiple sub-pages are available on the client device.

Estimation of the weight each of the multiple sub-pages also may be enabled. Enabling estimation of the weight of each of the multiple sub-pages may include generating random pieces of information of varying sizes. A weight of each of the random pieces of information may be calculated. The random pieces of information may be translated into a language used to display information on the client device. A weight of each of the random pieces of information after translation may be calculated. A linear regression may be performed between the calculated weights of the random pieces of information and the corresponding calculated weights of the random pieces of information after translation.

Calculating the weight of each of the random pieces of information may include calculating a size in memory of each of the random pieces of information. Calculating the weight of each of the random pieces of information may include calculating a display space used by each of the random pieces of information. Calculating the weight of each of the random pieces of information may include calculating a network data unit size required for each of the random pieces of information. Calculating the weight of each of the random pieces of information may include calculating a network latency for each of the random pieces of information. Calculating the weight of each of the random pieces of information may include identifying input devices required by each of the random pieces of information.

Estimating a weight of each of the multiple sub-pages may include using the linear regression performed between the calculated weights of the random pieces of information and the corresponding calculated weights of the random pieces of information after translation to estimate the weight of each of the multiple sub-pages after translation into a language used to display the multiple sub-pages based on a weight of each of the multiple sub-pages before translation into the language.

Identifying points within the page at which the page may be divided into multiple sub-pages may include inserting fragmentation points into the page at which the page may be divided into multiple sub-pages. The fragmentation points may include a level attribute. The page may be divided at fragmentation points with lower values for the level attribute before the page is divided at fragmentation points with higher values for the level attribute.

Identifying points within the page at which the page may be divided into multiple sub-pages may include identifying an initial fragmentation point within the page and a fragment size associated with the initial fragmentation point. Additional fragmentation points may be created at integer multiples of the fragment size from the initial fragmentation point. Identifying points within the page at which the page may be divided into sub-pages may include inserting markers around atomic pieces of the page.

Network, memory, and display requirements of the client device may be identified for use in determining if each of the multiple sub-pages may be used by the client device. Identifying network, memory, and display requirements of the client device may include receiving an identification of the client device and retrieving an indication of the network, memory, and display requirements from a database may be retrieved based on the received identification. Identifying network, memory, and display requirements of the client device also may include receiving an indication of network, memory, and display requirements of the client device from the client device.

These general and specific aspects may be implemented using a system, a method, or a computer program, or any combination of systems, methods, and computer programs. Other features will be apparent from the description and drawings, and from the claims.

DESCRIPTION OF DRAWINGS

Like reference symbols in the various drawings indicate like elements.

DETAILED DESCRIPTION

Figure 1:
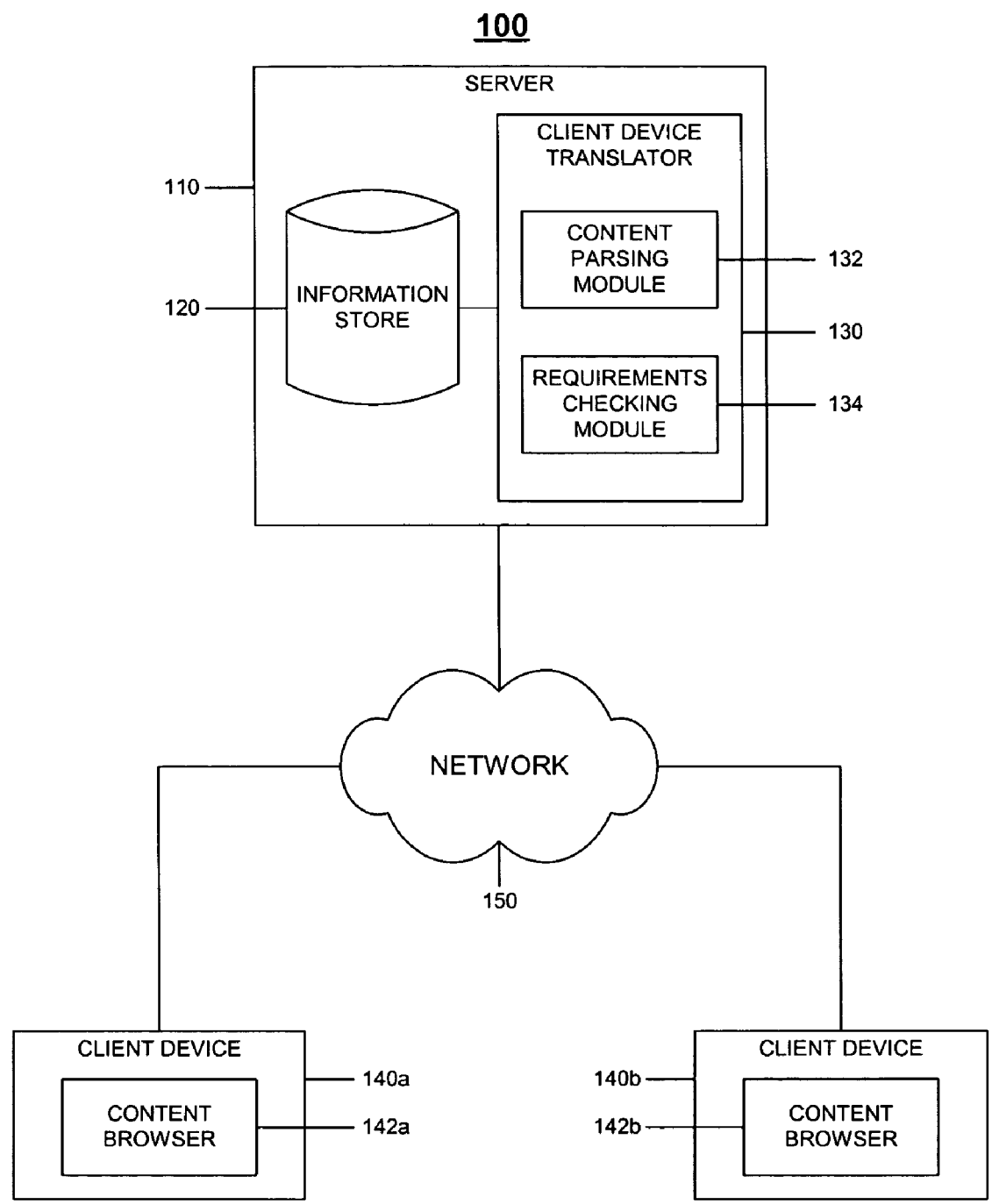
FIG. 1 is a block diagram of an exemplary system that fragments information for display on mobile devices.

Referring to FIG. 1, a computer system 100 may be used to transfer information between a server 110 and client devices 140a and 140b through a network 150. The server 110 includes an information store 120 configured to store information that may be transferred to the client devices 140a and 140b. The server 110 also includes a client device translator 130 that is responsible for processing and formatting information from the information store 120 for transfer to and display on the client devices 140a and 140b. More particularly, the client device translator 130 includes a content parsing module 132 and a requirements checking module 134. The content parsing module 132 parses information from the information store 120 into pages of an appropriate size for transfer to and display on the client devices 140a and 140b. The requirements checking module 134 verifies that the pages created by the content parsing module 132 are of an appropriate size for transfer to and display on the client devices 140a and 140b. Once received by the client devices 140a and 140b, the pages created by the content parsing module 132 are displayed on content browsers 142a and 142b associated with the respective client devices 140a and 140b. The pages are transferred to the client devices 140a and 140b through the network 150.

The server 110 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The server 110 may receive instructions from, for example, a software application, a program, a piece of code, a device, a computer, a computer system, or a combination thereof, which independently or collectively direct operations, as described herein. The instructions may be embodied permanently or temporarily in a machine, a component, a piece of equipment, a storage medium, or a propagated signal that is capable of being delivered to the server 110.

The server 110 includes a communications interface (not shown) used by the communications programs to send communications through the network 150. The communications may include, for example, e-mail, audio data, video data, general binary data, or text data (e.g., encoded in American Standard Code for Information Interchange (ASCII) format). The server 110 also includes one or more input devices, such as a keyboard, mouse, stylus, or microphone, as well as one or more output devices, such as a monitor, touch screen, speakers, or a printer.

The network 150 typically includes a series of portals interconnected through a coherent system. Examples of the network 150 include the Internet, Wide Area Networks (WANs), Local Area Networks (LANs), analog or digital wired and wireless telephone networks (e.g. a Public Switched Telephone Network (PSTN)), an Integrated Services Digital Network (ISDN), or a Digital Subscriber Line (xDSL)), or any other wired or wireless network. The network 150 may include multiple networks or subnetworks, each of which may include, for example, a wired or wireless data pathway.

As with the server 110, the client devices 140a and 140b may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The client devices 140a and 140b may receive instructions from, for example, a software application, a program, a piece of code, a device, a computer, a computer system, or a combination thereof, which independently or collectively direct operations, as described herein. These instructions may take the form of one or more communications programs that facilitate communications between the users of the client devices 140a and 140b, such as the content browsers 142a and 142b. The instructions may be embodied permanently or temporarily in a machine, a component, a piece of equipment, a storage medium, or a propagated signal that is capable of being delivered to the client devices 140a and 140b.

Further, the client devices 140a and 140b include a communications interface (not shown) used by the communications programs to send communications through the network 150. The communications may include, for example, e-mail, audio data, video data, general binary data, or text data (e.g., ASCII format).

Information that is stored within the information store 120 is sent to the client devices 140a and 140b in response to requests from the client devices 140a and 140b for the information. The information may be specified within the information store in a language that may not be used by the client devices 140a and 140b. For example, the client device 140a may be a wireless mobile computing device that requires information in wireless markup language (WML), but the information in the information store 120 may be specified in hypertext markup language (HTML). In such a case, the information in the information store 120 may need to be translated before being transported to and displayed on the client device 140a. The components of the client device translator 130 perform such a translation when preparing information to be sent to the client devices 140a and 140b.

The client devices 140a and 140b also may have operating restrictions that limit the amount of information that may be sent for display at one time. For example, the network bandwidth and latency available to transfer information to the client devices 140a and 140b may be limited. Similarly the memory available to store information on the client devices 140a and 140b may be limited. The display space available to display information with the content browsers 142a and 142b on the client devices 140a and 140b also may be limited. In addition, input devices of the client devices 140a and 140b may be limited in ability for handling large amounts of information. Therefore, a page of information identified from the information store 120 in response to a request from one of the client devices 140a and 140b may need to be divided into multiple smaller pages, or sub-pages such that all of the information requested by the client devices 140a and 140b may be transferred to, stored on, and displayed on the client devices 140a and 140b.

The client device translator 130 divides a page of content from the information store 120 into multiple pages. More particularly, the content parsing module 132 of the client device translator 130 divides pages of content received form the information store 120. In one implementation, the content parsing module 132 divides the page at predefined points that have been specified within the page. In such an implementation, the page may only be divided at the predefined points. The predefined points may have corresponding levels, and the page may divided at points with a lower level before the page is divided at points with a higher level. The points may be implicitly defined relative to one point through specification of an initial point and a distance. The points are then implicitly defined as a whole number multiple of the distance away from the initial point.

In another implementation, the content parsing module 132 divides the page into sub-pages by first dividing the page into atomic pieces and then constructing sub-pages out of the atomic pieces. An atomic piece is a piece of the page that must be kept whole and may not be divided. An example of an atomic piece may be a table of information. When dividing the page into atomic pieces, the content parsing module 132 associates information with each atomic piece that provides context to the atomic piece in the event that the atomic piece is on a sub-page without any other identifying features. When the content parsing module combines atomic pieces to form a sub-page, repetitive content is deleted, thereby enabling additional atomic pieces to be merged into the sub-page.

When dividing a page into sub-pages, the weights of the sub-pages are checked to ensure that the sub-pages may be transferred to, stored on, and displayed on the client devices 140a and 140b. The requirements checking module 134 determines whether the sub-pages meet the requirements of the client device. In one implementation, the weight of a sub-page includes a list of parameters including the size in memory of a sub-page, the amount of display space occupied by the sub-page, the network data unit size required, and the imposed network latency to transfer the sub-page, and the input devices required by the sub-page.

When determining whether the sub-page meets the requirements of the client devices 140a and 140b, the requirements checking module 134 may individually check each parameter in the list of parameters defining the weight of the sub-page against a maximum allowable value for each parameter. For example, the requirements checking module 134 compares the size in memory of the sub-page to a maximum allowable size in memory of a sub-page. Similarly, the requirements checking module 134 compares the display space occupied by the sub-page to a maximum allowable display space occupied by a sub-page. In addition, the requirements checking module 134 compares the network data unit size and latency required by the sub-page to maximum allowable values for the network data unit size and latency required by a sub-page. The requirements checking module 134 compares the input devices required by the sub-page to the input devices available for use with the client devices 140a and 140b.

In one implementation, the weight of a sub-page may be directly measured after a sub-page has been translated into the language in which the client devices 140a and 140b need the sub-page to be specified. In another implementation, the requirements checking module 134 estimates the weights of the sub-pages. In such an implementation, no translation of the sub-pages into the language needed by the client devices 140a and 140b is necessary. The requirements checking module 134 uses estimation information created before any requests from the client devices 140a and 140b are serviced to estimate the weights of the sub-pages. The estimation information is the result of a linear regression performed on a series of measurements of weights of pieces of randomly generated content both before and after the pieces of randomly generated content have been translated into the display language needed by the client devices.

Figure 2:
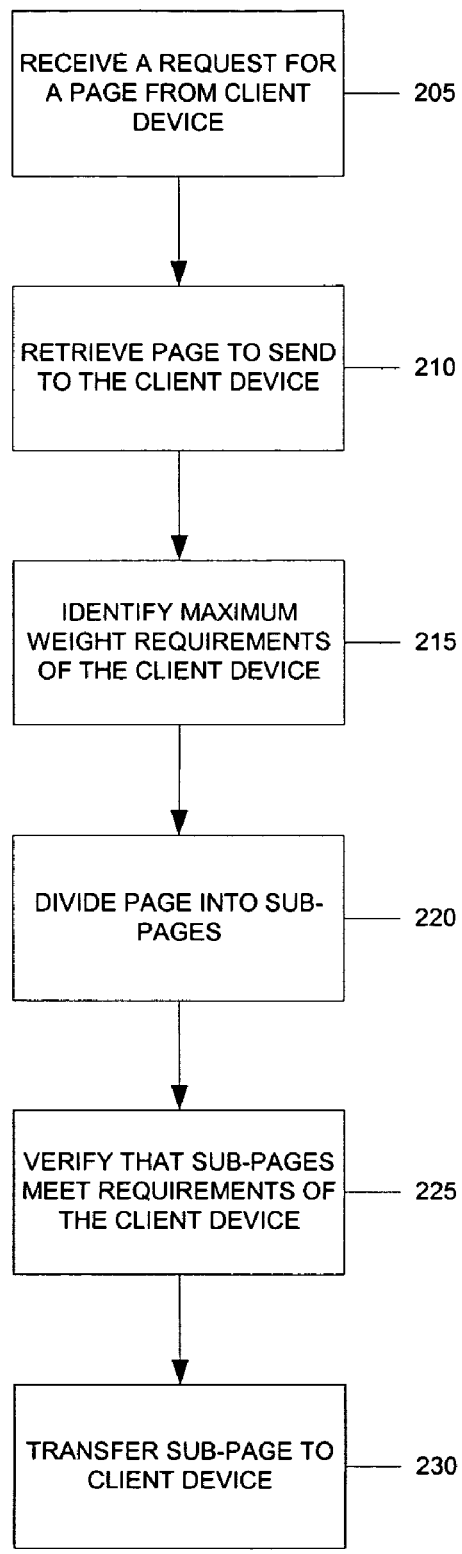
FIG. 2 is a flow chart of a process for fragmenting information for display on mobile devices.

Referring to FIG. 2, the server 110 of FIG. 1 executes a process 200 to service a request from a client device, such as the client devices 140a and 140b of FIG. 1. The process 200 formats information to be sent to the requesting device such that the information may be transferred to, stored on, and displayed on the requesting device.

The process 200 includes receiving a request for a page of information from a client device (step 205). The information requested may be stored in an information store, such as the information store 120 of FIG. 1. The information may be a static page or a page that is dynamically created. For example, a page may be dynamically created out of information retrieved from the information store. The server 110 retrieves the page that has been requested (step 210). For example, the server 110 may retrieve a static page from the information store, or the sever may construct a page out of information stored within the information store.

The server 110 also identifies the maximum weight requirements of the client device that submitted the request (step 215). The maximum weight requirements include a maximum value for each of the parameters stored in the list of parameters describing the weight of a piece of information. The maximum weight requirements associated with the requesting client device affect how the retrieved page is processed and formatted before being sent to the client device. The server 110 may identify the maximum weight requirements from a database that includes maximum weight requirements for each of the client devices that may request information from the server 110. The particular client device submitting a request for information may be identified from the request. For example, in implementations where the request is submitted to the server 110 using hypertext transfer protocol (HTTP), headers placed on the request identify the client device submitting the request. The server 110 may determine the type of client device submitting the request from the headers and use the determined type to access the maximum weight requirements from the database. Alternatively, the client device may submit maximum weight requirements with the request. For example, the maximum weight requirements may be in the header of a message sent to the server 110 that includes the request. As another example, the maximum weight requirements may be sent to the server 110 separately from the request. In such an implementation, identifying the maximum weight requirements of a client device comprises receiving the maximum weight requirements from the client device.

The server 110 then divides the page into sub-pages (step 220). In one implementation, parsing the page into sub-pages includes identifying points at which the page may be divided and dividing the page into sub-pages at the identified points. In another implementation, parsing the page into sub-pages includes dividing the page into atomic pieces and then constructing the sub-pages out of the atomic pieces.

The server 110 verifies that the sub-pages meet the requirements of the requesting client device (step 225). To do so, the server 110 verifies that weights of the sub-pages each are less than the maximum weight requirements of the requesting client device. In one implementation, the server 110 may do this by first translating the sub-pages into the proper language for the client device, and then directly measuring weight of the sub-pages. In another implementation, the server 110 may estimate weight of the sub-pages based on a linear regression that is performed before the request from the client device is received. If the sub-pages do meet the requirements of the requesting client device, then the sub-pages are transferred to the client device for display (step 230).

For simplicity, the weight of a sub-page will for the purposes of the following discussion refer to a single value representing the overall weight of the sub-page instead of to a list of parameters, each of which describes a characteristic of the sub-page relevant to whether the sub-page may be transferred to and displayed on the client device. Any description of the weight represented by a single value is applicable to the weight represented by a set of parameter values. For any operation involving the weight of a sub-page, performing the operation once using the single value is analogous to performing the operation once for each of the values in the set of values. For example, measuring or estimating the weight of a sub-page as a single value is analogous to measuring or estimating the value of each parameter included the list of parameters. Similarly, comparing the weight of a sub-page to the maximum weight requirements of the client device comprises individually comparing a value for each of the parameters in the set of parameter values that define the weight of the sub-page to the value of the same parameter from the list of parameters that defines the maximum weight requirements of the client device.

Figure 3:
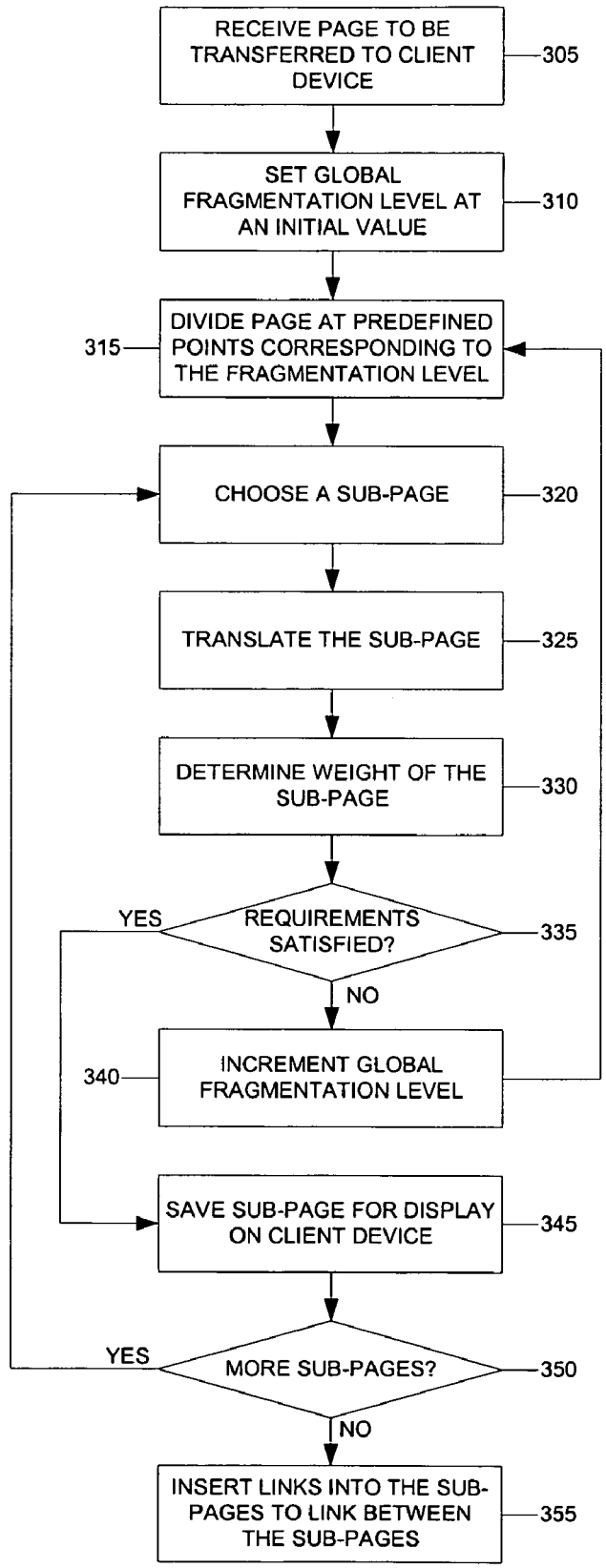
FIG. 3 is a flow chart of a process for statically fragmenting information for display on mobile devices into pieces and directly measuring the weight of the pieces.

Referring to FIG. 3, a process 300 is one implementation of the steps 220 and 225 of the process 200 of FIG. 2 for dividing a page of content into appropriately size sub-pages. More particularly, the process 300 identifies predefined points at which the page may be divided into sub-pages and divides the page at those points. The weights of the sub-pages are determined, and a sub-page is further divided if the weight of the sub-page does not meet the limitations on the maximum allowable weight of the client device that originally requested the page.

The process 300 is performed by the client device translator 130 of FIG. 1 after a request for a page has been received from the client device and after the page to be sent to the client device and the weight limitations of the client device have been identified. More particularly, the content parsing module 132 divides the page into sub-pages at the predefined points, and the requirements checking module 134 verifies that the sub-pages may be transferred to and displayed on the client device 140. The requirements checking module 134 translates the sub-pages into a language needed to transfer and display the sub-pages on the client device to aid in determining whether the sub-pages may be transferred to and displayed on the client device.

The points at which the page is fragmented may have an associated fragmentation level, and the page is divided at points with lower fragmentation levels before the page is divided at a point with a higher fragmentation level. For example, a page will be divided at a point with a fragmentation level of 1 before the page is fragmented at a point with a fragmentation level of 2. More particularly, for a given page or sub-page and a given fragmentation level, the page or sub-page is divided at all points with a fragmentation level less than the given fragmentation level before the page or sub-page is divided at points with a fragmentation level equal to the given fragmentation level. In one implementation, lower fragmentation levels correspond to larger sub-pages.

The points at which the page may be divided also may be specified relative to one point. For example, the points at which the page may be divided may be specified through specification of an initial point and a distance from the initial point. Other points are implicitly located at whole number multiples of the distance away from the initial point in the page. Such relative specification of the dividing points is useful when the page includes repetitive dynamically generated content that is retrieved, for example, from a database. Instead of manually adding the dividing points within the dynamically generated content, the dividing points are implicitly added to the dynamically generated content.

The process 300 begins when the client device translator 130 receives the page to be transferred to the client device (step 305). The page is identified after a request for the page is received from the client device. The page is retrieved from a store of pages, such as the information store 120 of FIG. 1. The client device may have limited network, memory, and display resources available to store and display the page in its entirety. Therefore, the page may be divided into sub-pages so that the sub-pages may be transferred to and displayed on the client devices individually in their entirety.

A global fragmentation level is set at an initial value (step 310). The global fragmentation level aids in the identification of points at which the page is divided. More particularly, the page is divided at points with fragmentation levels equal to the global fragmentation level, thereby creating one or more sub-pages (step 315). One of the sub-pages is chosen (step 320), and the chosen sub-page is translated into the display language (step 325).

The requirements checking module 134 determines the weight of the chosen sub-page (step 330). The weight may include the memory used by the sub-page and/or the display space occupied by the sub-page on the client device. The memory used by a sub-page includes the memory used by the sub-page itself as well as any memory used by information needed to identify the sub-page and by links from the sub-page to other sub-pages. The display space used is determined by the number of characters included in the sub-page and the associated information, as well as the size and formatting of the characters.

The requirements checking module 134 determines if the chosen sub-page satisfies the weight requirements imposed by the client device (step 335). If the sub-page does satisfy the requirements, then the sub-page is saved for display on the client device (step 345). The client device translator 130 determines whether there are more sub-pages that are to be checked for compliance with the weight requirements of the client device (step 350). If so, then another sub-page is chosen (step 320), translated (step 325), and checked for satisfaction of the requirements (steps 330 and 335). In this manner, the sub-pages created as a result of dividing the page at the predefined points with a fragmentation level equal to the global fragmentation level are sequentially checked for compliance with the requirements of the client device. Once there are no more sub-pages to be checked for compliance, then the page has been divided into multiple sub-pages that satisfy the requirements of the requesting client device. Links are inserted into each of the approved sub-pages to enable navigation between the sub-pages on the client device (step 355).

If a chosen sub-page does not satisfy the limitations of the client device (step 335), then the sub-page is divided further. To do so, the global fragmentation level is incremented to enable the chosen sub-page to be fragmented at a different set of points (step 340). The sub-page is divided at the predefined points that have a fragmentation level equal to the global fragmentation level that was just incremented, thereby creating more and smaller sub-pages (step 315). The smaller sub-pages are chosen sequentially and are sequentially checked for compliance with the requirements of the client device (steps 320-340). If one of the smaller sub-pages does not comply with the client device requirements, the smaller sub-page is divided further. In this manner, each sub-page is repeatedly divided until the sub-page or the parts thereof comply with the requirements of the client device.

Figure 4:
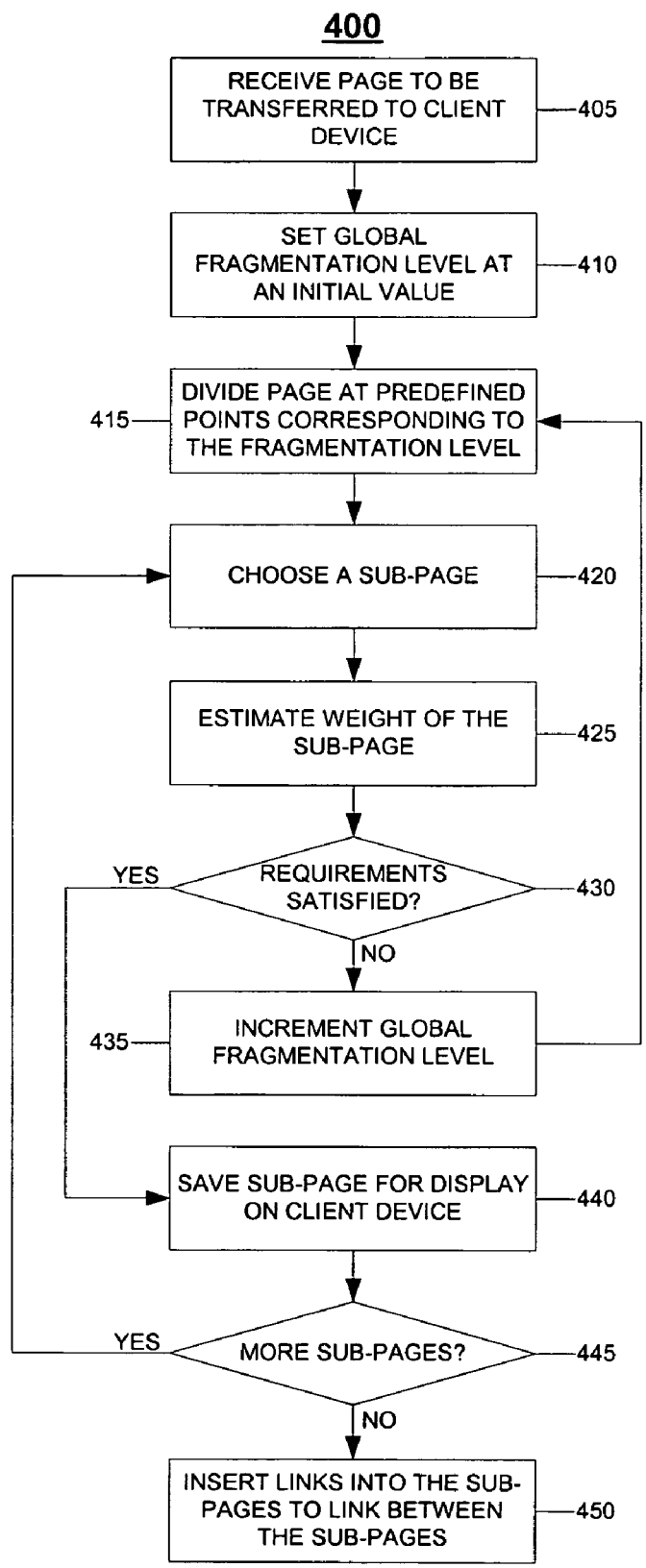
FIG. 4 is a flow chart of a process for statically fragmenting information for display on mobile devices into pieces and estimating the weight of the pieces.

Referring to FIG. 4, a process 400 is one implementation of the steps 220 and 225 of the process 200 of FIG. 2 for dividing a page of content into appropriately size sub-pages. More particularly, the process 400 identifies predefined points at which the page may be divided into sub-pages and divides the page at those points. As was described with respect to FIG. 3, the predefined points may have a fragmentation level that defines how the points are used to divide the page into sub-pages. In addition, the pre-defined points may be defined relative to another point. The weights of the sub-pages are estimated, and a sub-page is further divided if the weight of the sub-page does not meet the limitations on the weight of the client device that originally requested the page.

The process 400 is performed by the client device translator 130 of FIG. 1 after a request for a page has been received from the client device and after the page to be sent to the client device and the limitations of the client device have been identified. More particularly, the content parsing module 132 divides the page into sub-pages at the pre-defined points, and the requirements checking module 134 verifies that the sub-pages may be transferred to and displayed on the client device. The sub-pages may need to be translated into a language for transfer and display of the sub-pages, and the requirements checking module 134 estimates the weight of the atomic pieces when specified in the display language to aid the verification performed by the requirements checking module 134.

The process 400 begins when the client device translator 130 receives the page to be transferred to the client device (step 405). The page is identified after a request for the page is received from the client device. The page is retrieved from a store of pages, such as the information store 120 of FIG. 1. The client device may have limited network, memory, and display resources available to receive, store, and display the page in its entirety. Therefore, the page may be divided into sub-pages so that the sub-pages may be transferred to and displayed on the client devices individually in their entirety.

A global fragmentation level is set at an initial value (step 410). The global fragmentation level aids in the identification of points at which the page is divided. More particularly, the page is divided at points with fragmentation levels equal to the global fragmentation level, thereby creating one or more sub-pages (step 415). One of the sub-pages is chosen (step 420).

The requirements checking module 134 estimates the weight of the chosen sub-page when the chosen sub-page are in a language needed to transfer and display the (step 425). The requirements checking module 134 does not need to translate the sub-pages into the display language before performing the estimation. Instead, the requirements checking module 134 uses the information created as a result of the execution of a process to be discussed with respect to FIG. 5 to estimate the weight of the sub-pages.

The requirements checking module 134 determines if the chosen sub-page satisfies the weight requirements imposed by the client device (step 430). If the sub-page does satisfy the requirements, then the sub-page is saved for display on the client device (step 440). The client device translator 130 determines whether there are more sub-pages that are to be checked for compliance with the weight requirements of the client device (step 445). If so, then another sub-page is chosen (step 420) and checked for satisfaction of the requirements (steps 425 and 430). In this manner, the sub-pages created as a result of dividing the page at the predefined points with a fragmentation level equal to the global fragmentation level are sequentially checked for compliance with the requirements of the client device. Once there are no more sub-pages to be checked for compliance, then the page has been divided into multiple sub-pages that satisfy the requirements of the requesting client device. Links are inserted into each of the approved sub-pages to enable navigation between the sub-pages (step 450).

If a chosen sub-page does not satisfy the limitations of the client device (step 430), then the sub-page is divided further. To do so, the global fragmentation level is incremented to enable the chosen sub-page to be fragmented at a different set of points (step 435). The sub-page is divided at the predefined points that have a fragmentation level equal to the global fragmentation level that was just incremented, thereby creating more and smaller sub-pages (step 415). The smaller sub-pages are chosen sequentially and are sequentially checked for compliance with the requirements of the client device (steps 420-440). In this manner, each sub-page is repeatedly divided until the sub-page or the parts thereof comply with the requirements of the client device.

Figure 5:
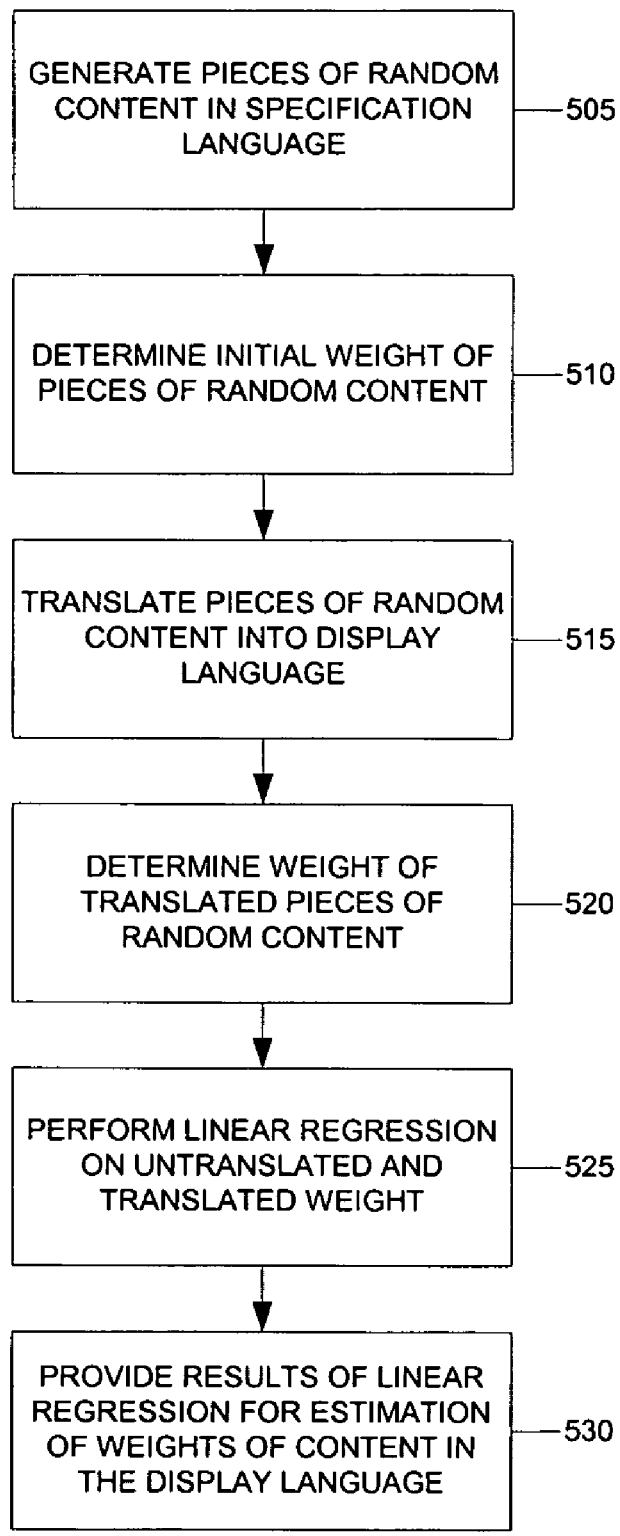
FIG. 5 is a flow chart of a process for generating information from which the characteristics of fragments of information may be estimated.

Referring to FIG. 5, a process 500 is used to generate information from which the weight of a piece of content, such as a sub-page from a page of content, may be estimated. The language in which the pieces of content are specified may be different than the language in which the pieces of content are transferred to and displayed on a client device requesting the content, so the weight of the piece of content in the specification language may be different than the weight of the piece of content in the display language. The process 500 enables the determination of the approximate amount of weight of a piece of content without having to translate the piece of content into the display language. The process 500 is performed by the content parsing module 132 of FIG. 1 before any requests for content are serviced.

The process 500 includes generating pieces of random content (step 505). The pieces of random content are in the specification language as opposed to the display language. The pieces of random content are of varying sizes such that the pieces of random content use different amounts of weight. Weights of the pieces of random content are determined (step 510). The weight of a piece of content may include the memory used by the piece of content. Determining the memory used by the pieces of random content includes adding the memory needed to add a link to each of the pieces of content to the amount of memory used by the pieces of content themselves. The link is used to navigate between the pieces of content when the pieces of content represent sub-pages of a whole page of content.

The pieces of random content are translated into the display language (step 515), and weights of the translated pieces of random content are determined (step 520). Again, the weight of a piece of content may include the memory used by the piece of content, and determining the memory used by the pieces of random content includes adding the memory needed to add a link to each of the pieces of content to the amount of memory used by the pieces of content themselves.

At this point, pieces of random content have been created in the specification language and the display language, and weights for each of the pieces in each of the languages have been determined. Each piece of random content in the display language corresponds to a piece of random content in the specification language from which the display language piece was translated. The weights of corresponding pieces form ordered pairs that aid in identifying a relationship between the weights of the pieces in the specification language and the weights of the pieces in the display language. A linear regression is performed to identify the closest linear relationship between the weights of the specification language pieces and the weights of the display language pieces (step 525). The linear regression produces a linear equation that may be used to estimate the weight of a piece of content in the display language from the weight of a piece of content in the specification language. The linear equation is provided to enable the estimation of weights of pieces of content in the display language (step 530).

In some implementations, the weight of a piece of content is represented by a list of parameters, each of which describe a characteristic of the piece of content relevant to whether the piece of content may be transferred to and displayed on a client device. In such implementations, a linear regression is performed for each of the parameters included in the list of parameters. More particularly, the value of each parameter is determined for each random piece of content, both before and after the pieces of random content are translated into the display language. A linear regression is performed for each of the parameters, thereby creating a linear equation for each of the parameters. Each of the linear equations may be used to estimate the value of the corresponding parameter of a piece of content in the display language from the value of the parameter for the piece of content in the specification language.

Figure 6:
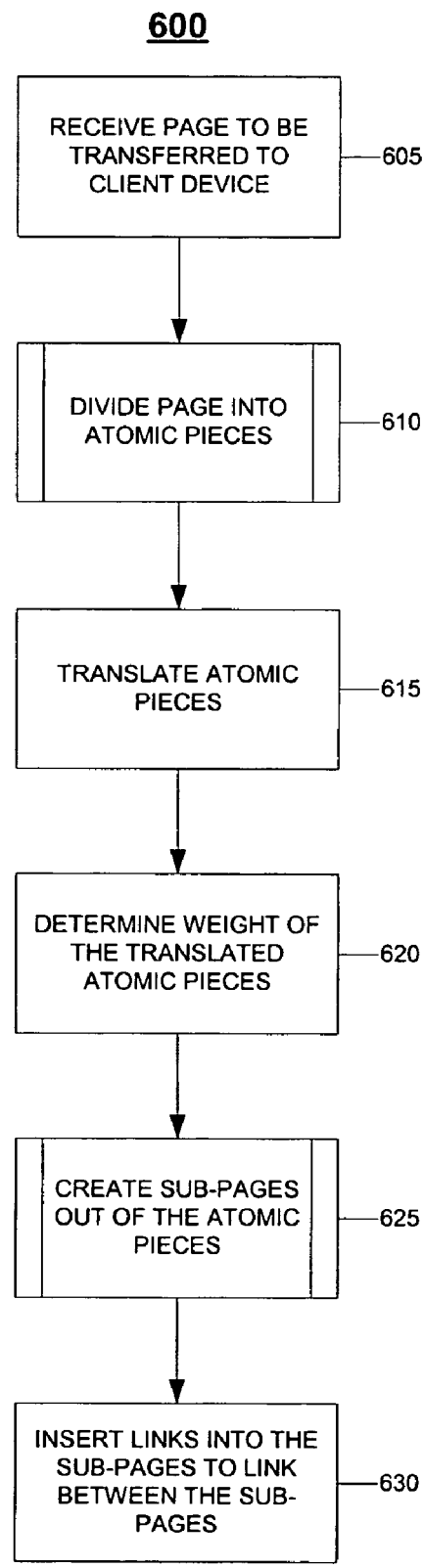
FIG. 6 is a flow chart of a process for dynamically fragmenting information for display on mobile devices into pieces and directly measuring the weight of the pieces.

Referring to FIG. 6, a process 600 is another implementation of the steps 220 and 225 of the process 200 of FIG. 2 for dividing a page of content into appropriately size sub-pages. More particularly, the process 600 identifies atomic pieces within a page that may not be divided among two sub-pages and then constructs sub-pages out of the atomic pieces while verifying that the constructed sub-pages meet the requirements of the device that requested the page. Atomic pieces may be indivisible by nature or may be formed by grouping content from the page through meta-information about the content specified with dedicated elements of the language used to specify the page. The process 600 is performed by the client device translator 130 of FIG. 1 after a request for a page has been received from a client device and after the page to be sent to the client device and the weight limitations of the client device have been identified. More particularly, the content parsing module 132 divides the page into atomic pieces and constructs the sub-pages out of the atomic pieces while verifying with the requirements checking module 134 that the sub-pages may be transferred to and displayed on the client device. The content parsing module 132 translates the atomic pieces into a language needed to transfer and display the sub-pages to aid the verification performed by the requirements checking module 134.

The process 600 begins when the client device translator 130 receives the page to be transferred to the client device (step 605). The page is identified after a request for the page is received from the client device. The page is retrieved from a store of pages, such as the information store 120 of FIG. 1. The client device may have limited network, memory, and display resources available to receive, store, and display the page in its entirety. Therefore, the page may be divided into sub-pages so that the sub-pages may be transferred to and displayed on the client devices individually in their entirety.

As a first step to doing so, the content parsing module 132 divides the page into atomic pieces (step 610). The process used by the content parsing module 132 to divide the page into atomic pieces is described below with respect to FIG. 7. When identifying atomic pieces, the content parsing module 132 associates with each atomic piece information to identify and to provide context to the atomic piece for use when the atomic piece appears on a sub-page without any other information to identify the atomic piece. The context may be in the form of a description of the structures within the page that include the atomic piece. After the page has been divided into the constituent atomic pieces, then each of the atomic pieces is translated into a language in which the sub-pages must be specified to be transferred to and displayed on the client device (step 615).

The requirements checking module 134 determines the weight of each of the translated atomic pieces (step 620). In some implementations, the weight of an atomic piece includes the memory used by the atomic piece. The memory used by an atomic piece includes the memory used by the atomic piece itself as well as any memory used by information needed to identify the atomic piece on a sub-page and by a link from a sub-page that includes the atomic piece to another sub-page. The display space used is determined by the number of characters included in the atomic piece and the associated information, as well as the size and formatting of the characters. The weight of each atomic piece is associated with each atomic piece for later use when constructing sub-pages out of the atomic pieces.

The content parsing module 132 then constructs the sub-pages out of the atomic pieces (step 625). To do so, the content parsing module 132 creates sub-pages and adds atomic pieces to each sub-page, each time verifying that the addition of the atomic piece to the sub-page does not violate the limitations on the weight of a sub-page imposed by the client device. The process used by the content parsing module 132 to create the sub-pages is described below with respect to FIG. 9. After the sub-pages have been created, then links are inserted into the sub-pages such that the sub-pages may be navigated (step 630). The sub-pages are transferred to the client device for display, which completes the servicing of the original request received from the client device.

Figure 7:
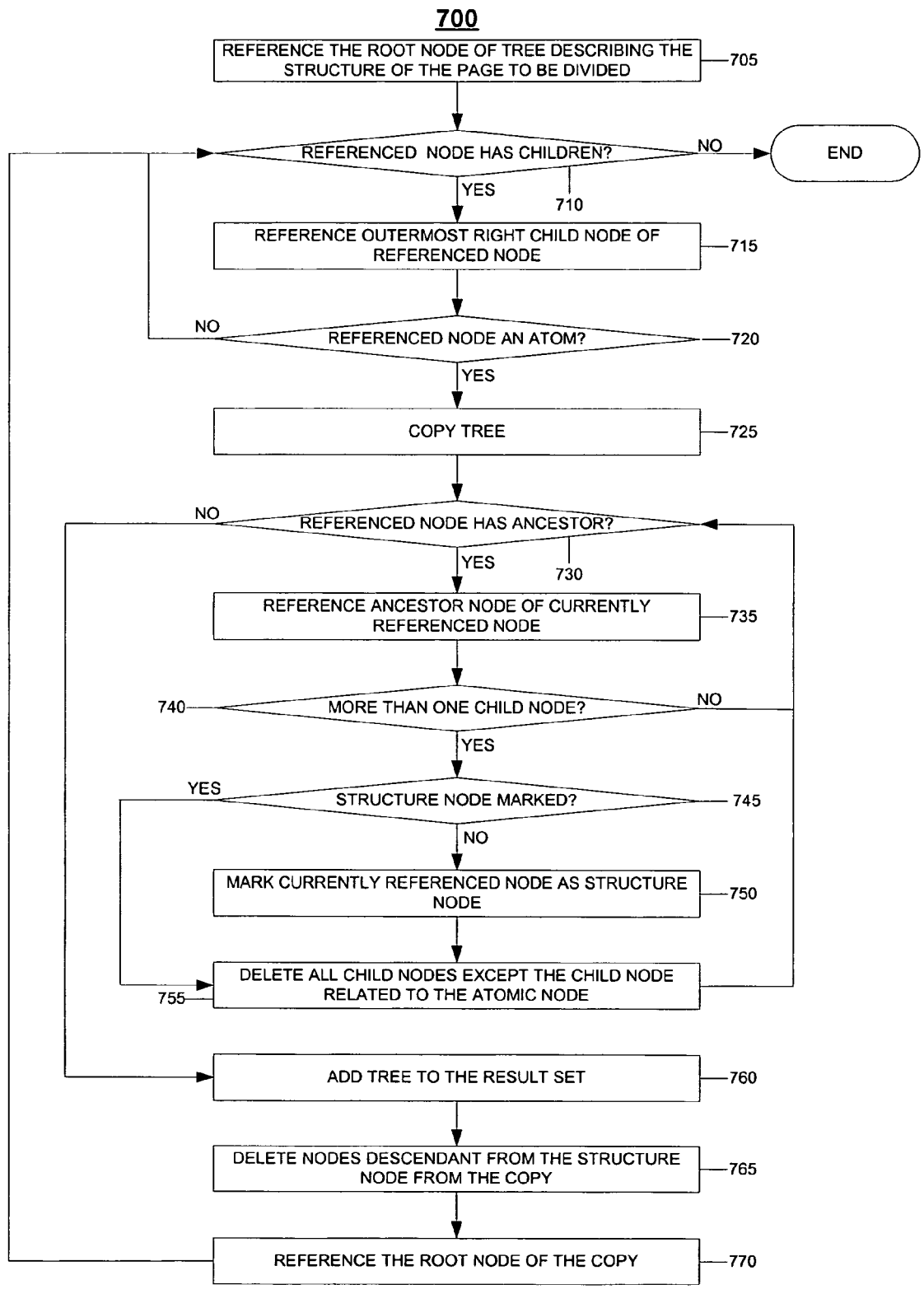
FIG. 7 is a flow chart of a process for dividing information into atomic pieces.

Referring to FIG. 7, a process 700 may be used to parse a page of content into atomic pieces. The process 700 is executed by the content parsing module 132 of FIG. 1. The process 700 is executed when a page is to be divided into atomic pieces, such as during step 610 of the process 600 of FIG. 6. The atomic pieces created as a result of the process 700 are later reassembled into smaller sub-pages that may be displayed on a client device with limited network, memory, or display resources.

The atomic pieces of the page are parts of the page that must be displayed as a whole on one of the sub-pages created from the main page for display on the client device. However, a sub-page that includes an atomic piece must also include information that provides context for the atomic piece. For example, the combination of a number of logically associated input fields within a larger form may be an atomic piece that is displayed on a sub-page that does not include any other parts of the form. Without some indication of the form that is eventually submitted, the meaning or use of the input fields may be unclear. Therefore, the process 700 associates information to provide context to an atomic piece with the atomic piece.

The page that is being parsed into atomic pieces may have a hierarchical structure in which some elements of the page define structures that include other elements of the page. For example, the page may be specified in a markup language, such as extensible markup language (XML), and the hierarchical structure of the page may be represented by the document object model (DOM) of the page. Under the document object model, the elements of the page are organized into a tree structure. In general, an element of the tree that has children, except for an element that correspond to text in the page, is a structural piece of the page, and an element of the tree that does not have structural pieces as children is an atomic piece. However, a structural piece with children may be manually defined as an atomic piece such that the sub-tree of the hierarchy rooted at the element may not be divided. Each atomic piece is included directly or indirectly in one or more structures. More particularly, an atomic piece is included in the structures defined by the elements in the tree that are ancestors to the atomic piece. Information describing the structures of which an atomic piece is a part may provide context to the atomic element and allow the atomic element to be identified. Therefore, as the page is parsed during the process 700, each of the atomic pieces may be associated with information describing the elements in the tree that are ancestors to the atomic pieces in the tree describing the structure of the page.

The process 700 begins when the root node of the tree that describes the structure of the page to be divided into atomic pieces is referenced (step 705). The root node is the node at the top of the tree and represents the overall structure of the page. The content parsing module 132 determines whether the referenced node has any children (step 710). If not, then there are no atomic pieces within the page, and the process 700 terminates. However, if the referenced node does have children, then one of the child nodes is referenced (step 715). Specifically, if an ordering is imposed on the child nodes and the nodes are displayed from right to left in order, the rightmost child node is referenced.

The content parsing module 132 determines if the currently referenced node represents an atomic piece (step 720). The content parsing module 132 may make such a determination by determining if the currently referenced node has been manually specified as the root of an atomic sub-tree that represents a structure within the page whose elements may not be separated. The content parsing module 132 also may determine if the currently referenced node is an atom by determining if the currently referenced node has any structural pieces as children. If not, then the currently referenced node is an atom.

If the currently referenced node does not represent an atomic piece (step 720), then the content parsing module 132 determines whether the referenced node has any children (step 710). If not, then there are no more atomic pieces within the page, and the process 700 terminates. However, if the referenced node does have children, then one of the child nodes is referenced (step 715). The same ordering and choice of child node to reference that was previously used is used again. In this manner, subsequent child nodes are repeatedly referenced until a node that represents an atomic piece is found. When a node representing an atomic piece is found (step 720), a copy of the tree is made and set aside for later use (step 725). A copy of the tree is necessary because the tree is modified as a result of identifying and extracting an atomic piece from the page.

The content parsing module 132 determines whether the currently referenced node, which represents an atomic piece of the page, has an ancestor (step 730). All nodes in the tree have an ancestor except for the root node, so determining whether the currently referenced node has an ancestor essentially includes determining whether the currently referenced node is the root of the tree. If the currently referenced node has an ancestor, then the ancestor of the currently referenced node is referenced (step 735). The content parsing module 132 determines whether the currently referenced node has more than one child node (step 740). If so, then the content parsing module 132 determines whether a structure node has been marked (step 745). If a structure node has not been marked, then the currently referenced node is marked as a structure node (step 750). A structure node is the closest ancestor to the previously identified node corresponding to an atomic piece that has multiple children. The multiple children are themselves nodes or ancestors of nodes that correspond to atomic pieces, so the structure represented by the structure node includes multiple atomic pieces. All child nodes of the structure node, except for child that is related to the previously identified node corresponding to an atomic piece, are deleted from the tree, as well as any nodes descendant from the deleted nodes (step 755). The deleted nodes and the corresponding descendents are still present within the previously made copy of the tree.

After the deletion (step 755), or if the currently referenced node does not have multiple children (step 740), the content parsing module 132 determines whether the currently referenced node has an ancestor (step 730). If so, the ancestor is referenced (step 735). If a structure node is found (step 740) and a structure node has not already been marked (step 755), then the ancestor is marked as a structure node (step 750). Regardless of whether the currently referenced node is a structure node, all children of the currently referenced node, except for the child that is either an ancestor of the previously identified node corresponding to an atomic piece or the previously identified node itself, are deleted from the tree, as well as any nodes descendant from the deleted nodes (step 755). In this manner, nodes are deleted from the tree as successive ancestors of the currently referenced node are identified until there are no other ancestors of the currently referenced node.

At this point, all that remains of the tree is the node that corresponds to the atomic piece and all of the ancestors of that node. In other words, an atomic piece and indicators of the structures of which the atomic piece is a part have been extracted from the page. The atomic piece may be displayed alone on a sub-page without any of the other parts of the corresponding structures that include the atomic pieces, and the atomic piece may be identified by the included indicators of the structures. The tree containing the currently referenced node, or the identified atomic piece, is added to the result set of atomic pieces (step 760). The nodes descendant from the previously identified structure node are deleted from the copy of the tree (step 765). The copy of the tree is used to identify further atomic pieces within the page. Deleting the sub-tree from the copy ensures that the same atomic piece is not identified twice. The content parsing module 132 references the root node of the copy of the tree (step 770), and another iteration of the process for identifying an atomic piece of the page begins when the content parsing module 132 determines whether the currently referenced node has children (step 710).

Figure 8A:
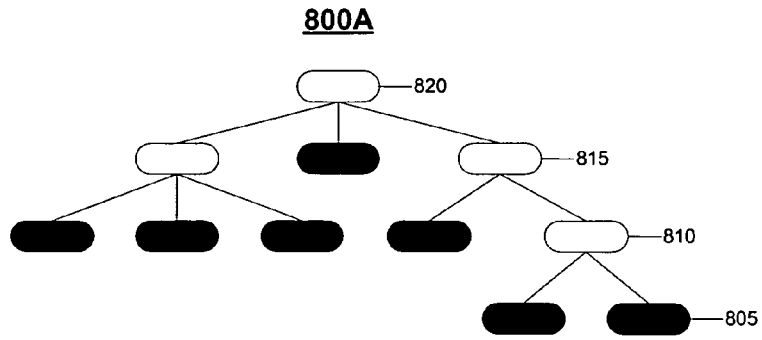
FIGS. 8A-8D are illustrations of the identification of an atomic piece of information.

FIGS. 8A-8D show an example of how an atomic piece is identified and extracted from a page of content with information describing the structures within the page that include the extracted atomic piece. More particularly, FIGS. 8A-8D illustrate one iteration of the process 700 in which a single atomic piece is identified and extracted from the page. Referring to FIG. 8A, the structure of the page is represented by a tree 800A. Initially the tree 800A includes seven nodes that represent atomic pieces, represented in the tree 800A as black nodes. For example, the node 805 represents an atomic piece of the page. The structures within the page are represented in the tree 800A as white structure nodes. For example, the nodes 810, 815, and 820 represent structures within the page. By repeatedly referencing the children of a referenced node, the node 805 is referenced and identified as representing an atomic piece.

Figure 8B:
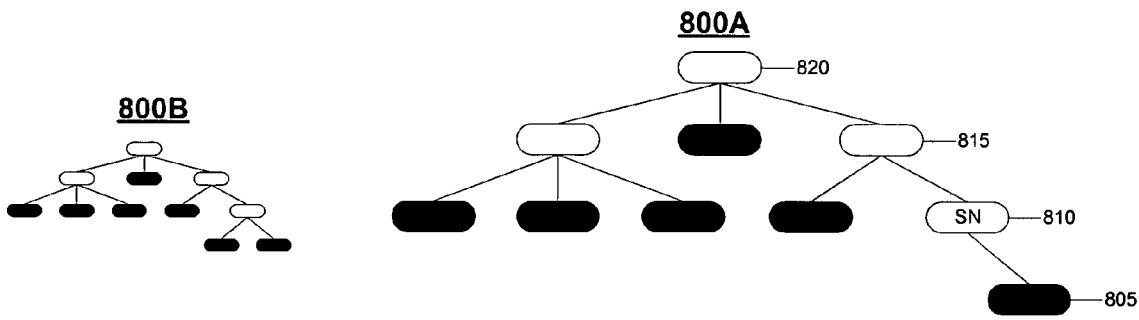

Referring to FIG. 8B, a copy 800B of the tree 800A has been made as a result of the identification of a node that represents an atomic piece. In addition, because the currently referenced node 805 has an ancestor, the ancestor of the node 805, or node 810, is referenced. The node 810 has multiple child nodes in the tree 800A of FIG. 8A, and a structure node has not been marked, so the node 810 is marked as a structure node. Consequently, all child nodes (connected below node 810), except for the node that represents an atomic piece, node 805, have been deleted from the tree 800A of FIG. 8B.

Figure 8C:
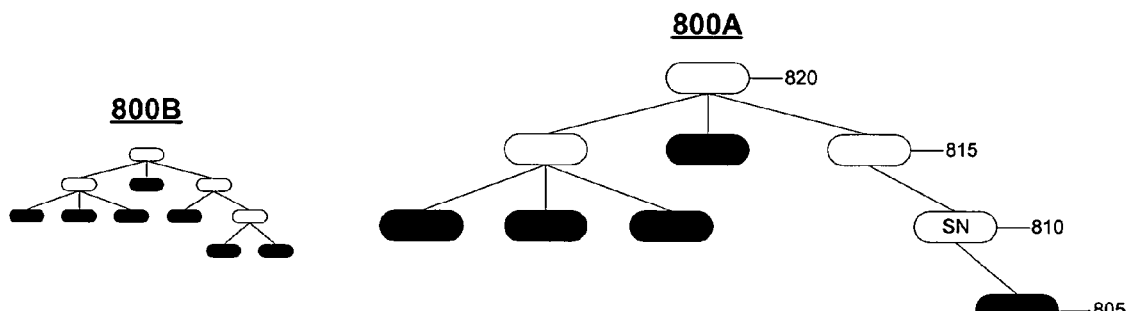

Referring to FIG. 8C, the copy 800B of the original tree 800A remains unchanged. In addition, because the currently referenced node 810 has an ancestor, the ancestor of the node 810, or node 815, is referenced. The node 815 has multiple child nodes in the tree 800A of FIG. 8A, so all child nodes (connected below node 815), except for the node 810 that is an ancestor of the node 805 that represents an atomic piece, have been deleted from the tree 800A of FIG. 8C.

Figure 8D:
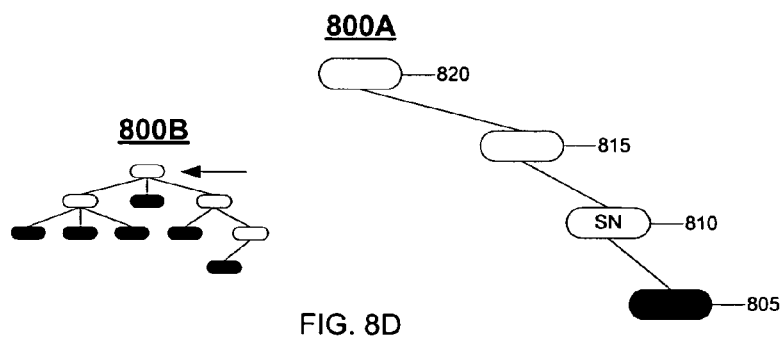

Referring to FIG. 8D, the currently referenced node 815 has an ancestor, so the ancestor of the node 815, or node 820, is referenced. The node 820 has multiple child nodes in the tree 800A of FIG. 8A, so all child nodes (connected below node 820), except for the node 815 that is an ancestor of the node 805 that represents an atomic piece, have been deleted from the tree 800A of FIG. 8D, as well as the sub-tree. The node 820 is the root of the tree 800A, so the node 820 does not have any ancestors. Therefore, the tree 800A represents an atomic piece of the page and information describing the structures within the page that include the atomic piece. More particularly, the atomic piece represented by the node 805 is included in the structures represented by the nodes 810, 815, and 820. The tree 800A is added to the set of atomic pieces. In addition, the copy 800B is accessed, and the nodes in the tree 800A below the marked structure node are deleted from the copy 800B in order to prevent later identification of the same atomic piece.

Figure 9:
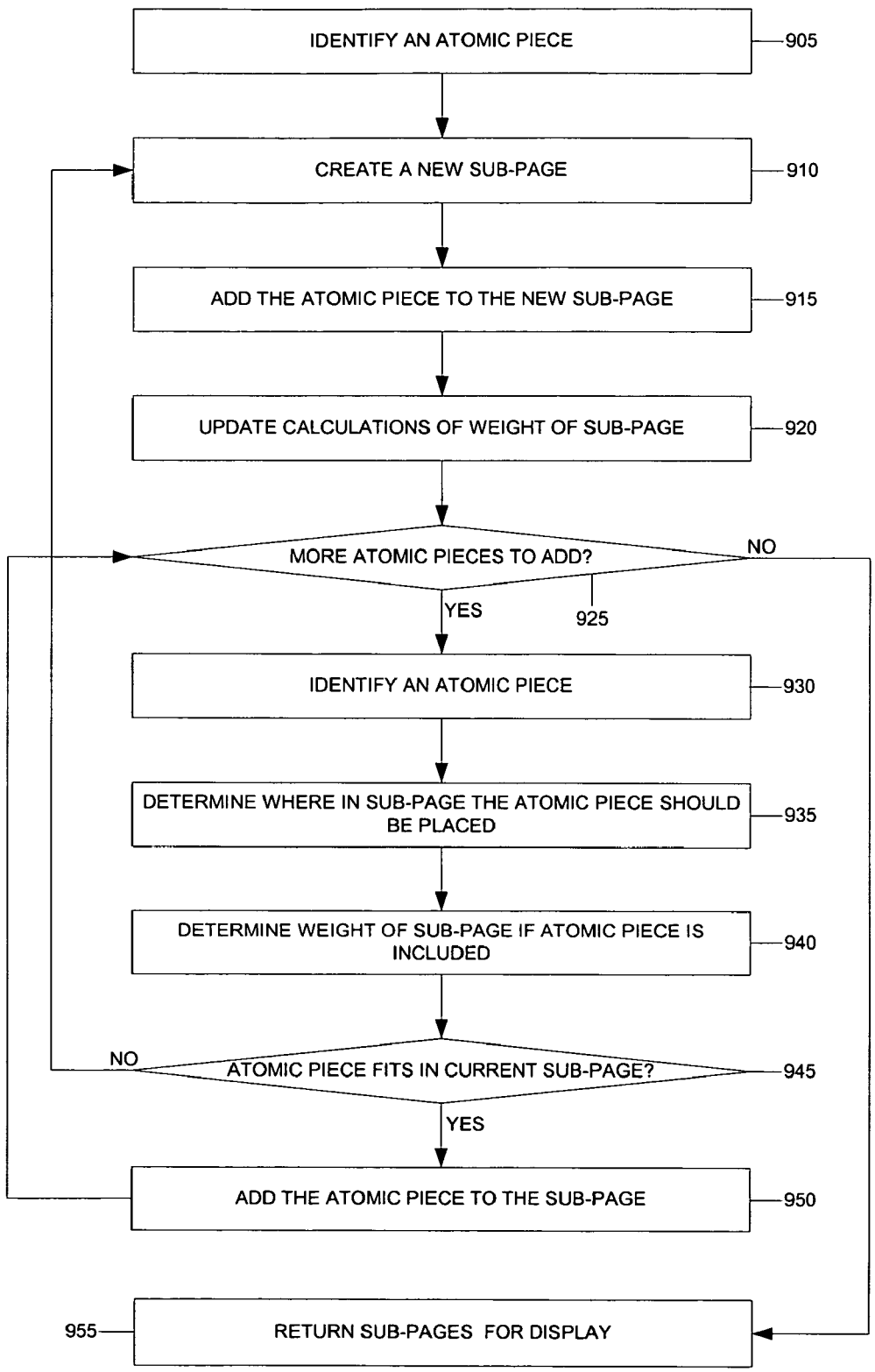
FIG. 9 is a flow chart of a process for creating information fragments out of atomic pieces.

Referring to FIG. 9, a process 900 may be used to create small sub-pages out of the atomic pieces of a page such that the sub-pages may be transferred to and displayed on a client device with limited resources. The process 900 is executed by the content parsing module 132 of FIG. 1. The process 900 is executed when sub-pages are to be constructed out of the atomic pieces of a page, such as during step 625 of the process 600 of FIG. 6. The atomic pieces used to construct the sub-pages are created as a result of the execution of, for example, the process 700 of FIG. 7.

Each of the atomic pieces used by the process 900 has corresponding information that describes the structures of the page that include the atomic piece. When multiple atomic pieces from the same structure are included in a single sub-page, the process 900 includes the corresponding information from one of the atomic pieces so that the sub-page does not include redundant information. Otherwise, the process 900 aggregates as many atomic pieces into a sub-page as will be allowed by the weight requirements of the client device on which the sub-pages are displayed.

The process 900 begins when the content parsing module 132 identifies an atomic piece to be added to an as yet uncreated sub-page (step 905). A new sub-page is created (step 910), and the identified atomic piece is added to the new sub-page (step 915). The content parsing module 132 updates calculations of weight of the sub-page (step 920). Before the identified atomic piece is added, the weight remaining for use by the sub-page is equal to a maximum allowable weight of a sub-page. When the atomic piece is added to the sub-page, the weight remaining for use by the sub-page is equal to the weight of the atomic piece subtracted from the maximum allowable weight of the sub page.

The content parsing module 132 determines whether there are more atomic pieces to be added to sub-pages (step 925). If there are more atomic pieces that may be added to the current sub-page, then an atomic piece is identified (step 930). The content parsing module 132 determines where the identified atomic piece should be located within the current sub-page (step 935). More particularly, the content parsing module 132 determines whether any other atomic pieces that are included in structures that include the identified atomic piece have been added to the current sub-page. If so, then the information describing the common structures is already included in the sub-page and does not need to be included with the identified atomic piece. Therefore, the identified atomic piece will not include as much weight as was originally calculated.

The content parsing module 132 then determines the weight requirements of the sub-page if the atomic piece is included (step 940). The content parsing module 132 considers whether the information describing the structures that include the identified atomic piece is included in the sub-page while determining the weight requirements of the sub-page with the atomic piece included. Based on the determined requirements, the content parsing module 132 determines if the atomic piece fits in the current sub-page (step 945). The atomic piece fits into the current sub-page if the weight of the sub-page with the atomic piece included is less than or equal to the maximum allowable weight of a sub-page.

If the atomic piece fits in the current sub-page, then the atomic piece is added to the current sub-page (step 950). Other atomic pieces are identified and added to the current sub-page until an atomic piece does not fit within the current sub-page (steps 925-950). When an atomic piece does not fit in the current sub-page, then a new sub-page is created (step 910), and atomic pieces are added to the newly created sub-page (steps 915-950). In this manner, sub-pages are created and all of the atomic pieces that fit within each sub-page are added to the sub-page. After each atomic piece has been added to a sub-page, the content parsing module 132 determines whether there are more atomic pieces to be added to sub-pages (step 925). If there are not more atomic pieces to add to sub-pages, then the current sub-page, as well as all other sub-pages that may have been created before the current sub-page, are returned for display on the client device (step 955).

Figure 10:
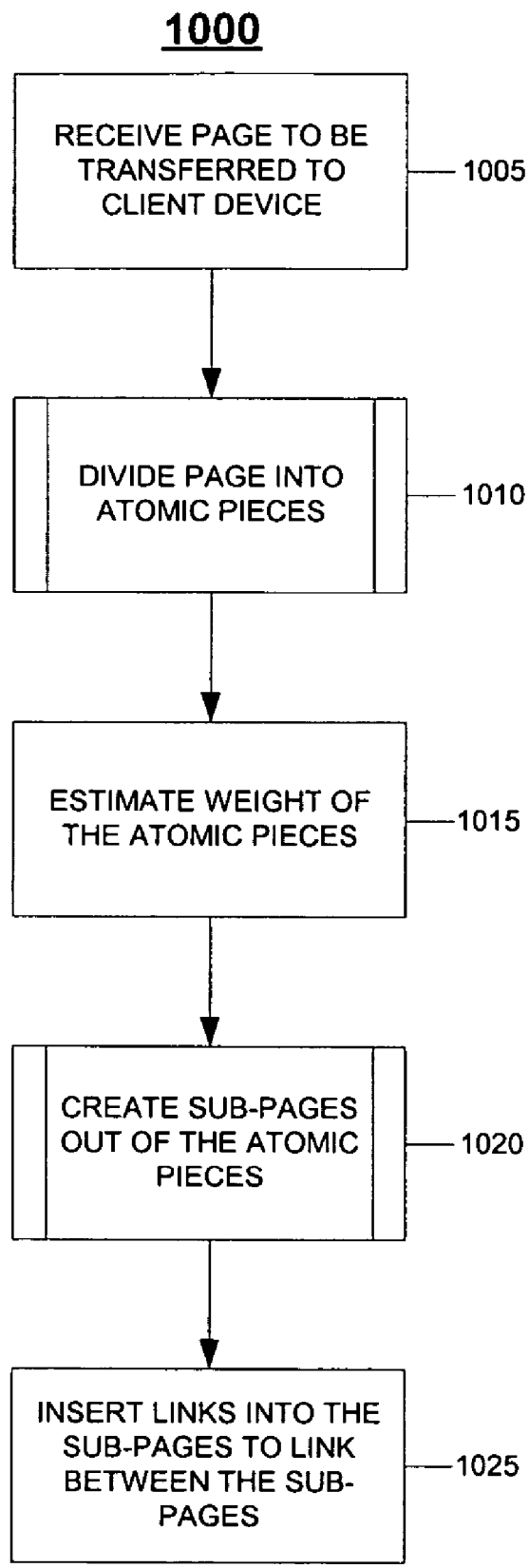
FIG. 10 is a flow chart of a process for dynamically fragmenting information for display on mobile devices into pieces and estimating the weight of the pieces.

Referring to FIG. 10, a process 1000 is another implementation of the steps 220 and 225 of the process 200 of FIG. 2 for dividing a page of content into appropriately size sub-pages. More particularly, the process 1000 identifies atomic pieces within a page that may not be divided between two sub-pages and then constructs sub-pages out of the atomic pieces while verifying that the sub-pages meet the requirements of the device that requested the page. The process 1000 is performed by the client device translator 130 of FIG. 1 after a request for a page has been received from a client device and after the page to be sent to the client device and the weight limitations of the client device have been identified. More particularly, the content parsing module 132 divides the page into atomic pieces and constructs the sub-pages out of the atomic pieces while verifying with the requirements checking module 134 that the sub-pages may be transferred to and displayed on the client device. The atomic pieces may need to be translated into a language needed to transfer and display the sub-pages, and the requirements checking module 134 estimates the weight of the atomic pieces when specified in the display language to aid the verification performed by the requirements checking module 134.

The process 1000 begins when the client device translator 130 receives the page to be transferred to the client device (step 1005). The page is identified after a request for the page is received from the client device. The page is retrieved from a store of pages, such as the information store 120 of FIG. 1. The client device may have limited network, memory, and display resources available to receive, store, and display the page in its entirety. Therefore, the page may be divided into sub-pages so that the sub-pages may be transferred to and displayed on the client devices individually in their entirety.

As a first step to doing so, the content parsing module 132 divides the page into atomic pieces (step 1010). The process used by the content parsing module 132 to divide the page into atomic pieces is described above with respect to FIG. 7. When identifying atomic pieces, the content parsing module 132 associates with each atomic piece information to identify and to provide context to the atomic piece for use when the atomic piece appears on a sub-page without any other information to identify the atomic piece. The context may be in the form of a description of the structures within the page that include the atomic piece.

After the page has been divided into the constituent atomic pieces, the requirements checking module 134 estimates the weight of each of the atomic pieces when the atomic pieces are in a language needed to transfer and display the atomic pieces (step 1015). The requirements checking module 134 does not need to translate the atomic pieces into the display language before performing the estimation. Instead, the requirements checking module 134 uses the information created as a result of the execution of the process 500 of FIG. 5 to estimate the weight of the atomic pieces. The linear equation created during execution of the process 500 relates weight the atomic pieces in the language in which the atomic pieces are originally specified to the weight of the atomic pieces when in the display language. The requirements checking module 134 may then use the linear equation to estimate the size of the atomic pieces in the display language after determining the weight of the atomic pieces in the specification language.

The content parsing module 132 then constructs the sub-pages out of the atomic pieces (step 1020). To do so, the content parsing module 132 creates sub-pages and adds atomic pieces to each sub-page, each time verifying that the addition of the atomic piece to the sub-page does not violate the limitations on the weight of a sub-page imposed by the client device. The process used by the content parsing module 132 to create the sub-pages is described above with respect to FIG. 9. After the sub-pages have been created, then links are inserted into the sub-pages such that the sub-pages may be navigated (step 1025). The sub-pages are transferred to the client device for display, which completes the servicing of the original request received from the client device.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method for servicing a request for information from a device with limited network, memory, and display resources, the method comprising:
   receiving a request for a page of information from a client device; retrieving the requested page;
   identifying points within the page at which the page may be divided into sub-pages;
   separating the page at the identified points into multiple sub-pages;
   determining if each of the multiple sub-pages may be used by the client device; linking the multiple sub-pages; and
   transferring individually the multiple sub-pages to the client device,
   wherein the points within the page at which the page may be divided into sub-pages define atomic pieces of the page that may not be further divided;
   wherein separating the page at the identified points into multiple sub-pages comprises:
      dividing the page into atomic pieces at the identified points, and
      combining the atomic pieces to construct the multiple sub-pages; and
   wherein combining the atomic pieces to construct the multiple sub-pages comprises:
      creating a sub-page of the multiple sub-pages, the sub-page having a weight that is initially zero,
      identifying a single atomic piece,
      determining where in the sub-page the single atomic piece may be added;
      determining whether the single atomic piece may be added to the sub-page,
      adding the single atomic piece to the sub-page, and
      updating the weight of the sub-page based on the addition of the single atomic piece to the sub-page.

2. The method of claim 1 wherein separating the page at the identified points comprises:
   selecting at least one of the identified points; and dividing the page at the at least one selected point to create multiple sub-pages.

3. The method of claim 1 wherein the identified points are defined by elements of a language in which the information is represented, and wherein the elements define the atomic pieces of the page.

4. The method of claim 1 wherein dividing the page into atomic pieces at the identified points comprises:
   identifying atomic pieces of the page;
   identifying structures within the page that include the atomic pieces;
   coupling descriptions of the structures to the atomic pieces; and
   adding the coupling of the atomic pieces and the corresponding descriptions of the structures to a set of atomic pieces of the page.

5. The method of claim 1 wherein determining whether the single atomic piece may be added to the sub-page comprises determining if the weight of the sub-page with the single atomic piece added is less than or equal to a maximum allowable weight for each of the multiple sub-pages.

6. The method of claim 5 wherein determining if the weight of the sub-page with the single atomic piece added is less than or equal to a maximum allowable weight for each of the multiple sub-pages comprises determining if a size in memory of the sub-page with the single atomic piece added is less than or equal to a maximum allowable size in memory for each of the multiple sub-pages.

7. The method of claim 5 wherein determining if the weight of the sub-page with the single atomic piece added is less than or equal to a maximum allowable weight for each of the multiple sub-pages comprises determining if a display space used by the sub-page with the single atomic piece added is less than or equal to a maximum allowable display space used by each of the multiple sub-pages.

8. The method of claim 5 wherein determining if the weight of the sub-page with the single atomic piece added is less than or equal to a maximum allowable weight for each of the multiple sub-pages comprises determining if a network data unit size required for the sub-page with the single atomic piece added is less than or equal to a maximum allowable network data unit size required for each of the multiple sub-pages.

9. The method of claim 5 wherein determining if the weight of the sub-page with the single atomic piece added is less than or equal to a maximum allowable weight for each of the multiple sub-pages comprises determining if a network latency for the sub-page with the single atomic piece added is less than or equal to a maximum allowable network latency for each of the multiple sub-pages.

10. The method of claim 5 wherein determining if the weight of the sub-page with the single atomic piece added is less than or equal to a maximum allowable weight for each of the multiple sub-pages comprises determining if input devices required by the sub-page with the single atomic piece added are available on the client device.

11. The method of claim 1 wherein determining if each of the multiple sub-pages may be used by the client device comprises:
    translating each of the multiple sub-pages into a language used to display the multiple sub-pages;
    calculating a weight of each of the multiple sub-pages after translation; and
    comparing each of the calculated weights to a maximum allowable weight.

12. The method of claim 11 wherein calculating the weight of each of the multiple sub-pages after translation comprises calculating a size in memory of each of the multiple sub-pages after translation.

13. The method of claim 11 wherein calculating the weight of each of the multiple sub-pages after translation comprises calculating a display space used by each of the multiple sub-pages after translation.

14. The method of claim 11 wherein calculating the weight of each of the multiple sub-pages after translation comprises calculating a network data unit size required for each of the multiple sub-pages after translation.

15. The method of claim 11 wherein calculating the weight of each of the multiple sub-pages after translation comprises calculating a network latency for each of the multiple sub-pages after translation.

16. The method of claim 11 wherein:
    calculating the weight of each of the multiple sub-pages after translation comprises identifying input devices required by each of the multiple sub-pages after translation; and comparing each of the calculated weights to a maximum allowable weight comprises determining if the input devices required by each of the multiple sub-pages after translation are available on the client device.

17. The method of claim 1 wherein determining if each of the multiple sub-pages may be used by the client device comprises:
estimating a weight of each of the multiple sub-pages; and
comparing each of the estimated weights to a maximum allowable weight.

18. The method of claim 17 wherein estimating the weight of each of the multiple sub-pages comprises estimating a size in memory of each of the multiple sub-pages.

19. The method of claim 17 wherein estimating the weight of each of the multiple sub-pages comprises estimating a display space used by each of the multiple sub-pages.

20. The method of claim 17 wherein estimating the weight of each of the multiple sub-pages comprises estimating a network data unit size required for each of the multiple sub-page.

21. The method of claim 17 wherein estimating the weight of each of the multiple sub-pages comprises estimating a network latency for each of the multiple sub-pages.

22. The method of claim 17 wherein:
estimating the weight of each of the multiple sub-pages comprises estimating input devices required by each of the multiple sub-pages; and
comparing each of the estimated weights to a maximum allowable weight comprises determining if the input devices required by each of the multiple sub-pages are available on the client device.

23. The method of claim 17 further comprising enabling estimation of the weight each of the multiple sub-pages.

24. The method of claim 23 wherein enabling estimation of the weight of each of the multiple sub-pages comprises:
generating random pieces of information of varying sizes;
calculating a weight of each of the random pieces of information;
translating the random pieces of information into a language used to display information on the client device;
calculating a weight of each of the random pieces of information after translation; and
performing a linear regression between the calculated weights of the random pieces of information and the corresponding calculated weights of the random pieces of information after translation.

25. The method of claim 24 wherein calculating the weight of each of the random pieces of information comprises calculating a size in memory of each of the random pieces of information.

26. The method of claim 24 wherein calculating the weight of each of the random pieces of information comprises calculating a display space used by each of the random pieces of information.

27. The method of claim 24 wherein calculating the weight of each of the random pieces of information comprises calculating a network data unit size required for each of the random pieces of information.

28. The method of claim 24 wherein calculating the weight of each of the random pieces of information comprises calculating a network latency for each of the random pieces of information.

29. The method of claim 24 wherein calculating the weight of each of the random pieces of information comprises identifying input devices required by each of the random pieces of information.

30. The method of claim 24 wherein estimating a weight of each of the multiple sub-pages comprises using the linear regression performed between the calculated weights of the random pieces of information and the corresponding calculated weights of the random pieces of information after translation to estimate the weight of each of the multiple sub-pages after translation into a language used to display the multiple sub-pages based on a weight of each of the multiple sub-pages before translation into the language.

31. The method of claim 1 wherein identifying points within the page at which the page may be divided into multiple sub-pages includes inserting fragmentation points into the page at which the page may be divided into multiple sub-pages.

32. The method of claim 31 wherein:
the fragmentation points include a level attribute; and
the page is divided at fragmentation points with lower values for the level attribute before the page is divided at fragmentation points with higher values for the level attribute.

33. The method of claim 1 wherein identifying points within the page at which the page may be divided into multiple sub-pages comprises:
identifying an initial fragmentation point within the page;
identifying a fragment size associated with the initial fragmentation point; and
creating additional fragmentation points at integer multiples of the fragment size from the initial fragmentation point.

34. The method of claim 1 wherein identifying points within the page at which the page may be divided into sub-pages comprises inserting markers around atomic pieces of the page.

35. The method of claim 1 further comprising identifying network, memory, and display requirements of the client device for use in determining if each of the multiple sub-pages may be used by the client device.

36. The method of claim 35 wherein identifying network, memory, and display requirements of the client device comprises:
receiving an identification of the client device; and
retrieving an indication of the network, memory, and display requirements from a database based on the received identification.

37. The method of claim 35 wherein identifying network, memory, and display requirements of the client device comprises receiving an indication of network, memory, and display requirements of the client device from the client device.

38. A method for fragmenting a page for a device that is unable to receive or display the page as a whole, the method comprising:
identifying a page that is to be sent to a client device;
dividing the page into atomic pieces;
combining the atomic pieces to construct multiple sub-pages;
estimating a weight of each of the multiple sub-pages;
comparing the weight of each of the multiple sub-pages to a maximum allowable weight; and
transferring individually the multiple sub-pages to the client device;
wherein combining the atomic pieces to construct multiple sub-pages comprises;
creating a sub-page of the multiple sub-pages, the sub-page having a weight that is initially zero,
identifying a single atomic piece, determining whether the single atomic piece may be added to the sub-page, determining where in the sub-page the single atomic piece may be added adding the single atomic piece to the sub-page, and updating the weight of the sub-page based on the addition of the single atomic piece to the sub-page.

39. The method of claim 38 wherein dividing the page into the atomic pieces comprises:

identifying atomic pieces of the page; identifying structures within the page that include the atomic pieces;

coupling descriptions of the structures to the atomic pieces; and adding the coupling of the atomic pieces and the corresponding descriptions of the structures to a set of atomic pieces of the page.

40. The method of claim 38 wherein determining whether the single atomic piece may be added to the sub-page comprises determining if the weight of the sub-page with the single atomic piece added is less than or equal to a maximum allowable weight for each of the multiple sub-pages.

41. The method of claim 38 further comprising enabling estimation of the weight of each of the multiple sub-pages.

42. The method of claim 41 wherein enabling estimation of the weight of each of the multiple sub-pages comprises:

generating random pieces of information of varying sizes;

calculating a weight of each of the random pieces of information;

translating the random pieces of information into a language used to display information on the client device;

calculating a weight of each of the random pieces of information after translation; and performing a linear regression between the calculated weights of the random pieces of information and the corresponding calculated weights of the random pieces of information after translation.

43. The method of claim 42 wherein estimating the weight of each of the multiple sub-pages comprises using the linear regression performed between the calculated weights of the random pieces of information and the corresponding calculated weights of the random pieces of information after translation to estimate the weight of each of the multiple sub-pages after translation into a language used to display the multiple sub-pages based on a weight of each of the multiple sub-pages before translation into the language.

44. The method of claim 38 further comprising identifying the maximum allowable weight based on network, memory, and display requirements of the client device.

45. A method for fragmenting a page for a device that is unable to receive or display the page as a whole, the method comprising:

identifying a page that is to be sent to a client device;

dividing the page into atomic pieces;

combining the atomic pieces to construct multiple sub-pages;

translating each of the multiple sub-pages into a language used to display the multiple sub-pages;

calculating a weight of each of the translated sub-pages;

comparing the weight of each of the translated sub-pages to a maximum allowable weight; and transferring individually the translated sub-pages to the client device, wherein combining the atomic pieces to construct multiple sub-pages comprises:

creating a sub-page of the multiple sub-pages, the sub-page having a weight that is initially zero, identifying a single atomic piece, determining whether the single atomic piece may be added to the sub-page, determining where in the sub-page the single atomic piece may be added, adding the single atomic piece to the sub-page, and updating the weight of the sub-page based on the addition of the single atomic piece to the sub-page.

46. The method of claim 45 wherein dividing the page into the atomic pieces comprises:

identifying atomic pieces of the page;

identifying structures within the page that include the atomic pieces;

coupling descriptions of the structures to the atomic pieces; and adding the coupling of the atomic pieces and the corresponding descriptions of the structures to a set of atomic pieces of the page.

47. The method of claim 45 wherein determining whether the single atomic piece may be added to the sub-page comprises determining if the weight of the sub-page with the single atomic piece added is less than or equal to a maximum allowable weight for each of the multiple sub-pages.

48. The method of claim 45 further comprising identifying the maximum allowable weight based on network, memory, and display requirements of the client device.

49. A method for fragmenting a page for a device that is unable to receive or display the page as a whole, the method comprising:

identifying a page that is to be sent to a client device;

identifying fragmentation points within the page at which the page may be divided into sub-pages;

dividing the page in at least one of the identified fragmentation points to create multiple sub-pages;

enabling estimation of the weight of each of the multiple sub-pages;

estimating a weight of each of the multiple sub-pages;

comparing the weight of each of the multiple sub-pages to a maximum allowable weight; and transferring individually the multiple sub-pages to the client device, wherein enabling estimation of the weight of each of the sub-pages comprises generating random pieces of information of varying sizes, calculating a size of each of the random pieces of information, translating the random pieces of information into a language used to display information on the client device, calculating a weight of each of the random pieces of information after translation, and performing a linear regression between the calculated weights of the random pieces of information and the corresponding calculated weights of the random pieces of information after translation.

50. The method of claim 49 wherein:

the fragmentation points include a level attribute; and dividing the page in at least one of the identified fragmentation points comprises dividing the page at fragmentation points with a lower value for the level attribute before dividing the page at fragmentation points with a higher value for the level attribute.

51. The method of claim 49 wherein identifying fragmentation points within the page comprises:

identifying an initial fragmentation point within the page;

identifying a fragment size associated with the initial fragmentation point; and creating additional fragmentation points at integer multiples of the fragment size from the initial fragmentation point.

52. The method of claim 49 wherein estimating the weight of each of the multiple sub-pages comprises using the linear regression performed between the calculated weights of the random pieces of information and the corresponding calculated weights of the random pieces of information after translation to estimate the weight of each of the multiple sub-pages after translation into a language used to display the multiple sub-pages based on a weight of each of the multiple sub-pages before translation into the language.

53. The method of claim 49 further comprising identifying the maximum allowable weight based on network, memory, and display requirements of the client device.

* * * * *